Figure 1:
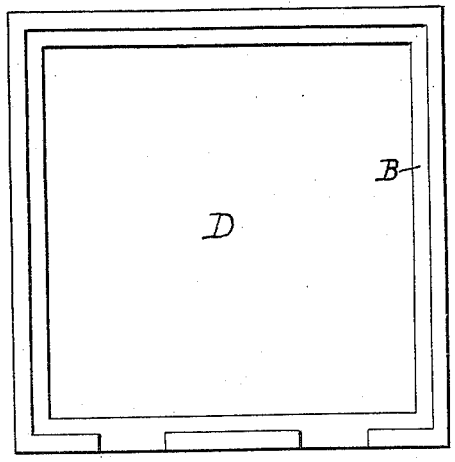

(No Model.)

W. STANLEY, Jr.
SECONDARY BATTERY.

No. 299,177. Patented May 27, 1884.

Witnesses.
Harry Overington
Chas. C. Claggett.

Inventor.
Wm Stanley Jr.
by Clarkson A. Collins
Atty

UNITED STATES PATENT OFFICE.

WILLIAM STANLEY, JR., OF ENGLEWOOD, NEW JERSEY.

SECONDARY BATTERY.

SPECIFICATION forming part of Letters Patent No. 299,177, dated May 27, 1884.

Application filed June 19, 1883. (No model.)

*To all whom it may concern:*

Be it known that I, WILLIAM STANLEY, Jr., a resident of Englewood, in the county of Bergen and State of New Jersey, have invented certain new and useful Improvements in Secondary Batteries, of which the following is a specification.

My invention relates to the manner of constructing the plates of secondary batteries and forming or charging them with oxygen and hydrogen, ready for use in the battery.

I construct the plates of my battery primarily of plumbic carbonate—the white lead of commerce—which I treat in the follow manner: To any desired quantity of white lead ground fine I add about twenty per cent. of its volume of common salt. Reduce the mixture to a paste with salt-water and pour it into a mold of suitable shape. Before pouring in the mixture I place in the bottom of the mold a sheet or strips of stout paper or cloth of such length that the ends shall hang over the sides of the mold, and may be used as handles to lift the completed plate from the mold. If desired, while the mixture is still soft, a perforated lead plate to form the core or skeleton of the active material may be applied and pressed in, so that it will be firmly attached to the hardened plate of active material. The mold containing the mixture is then placed in a drying-oven and heated till the water is evaporated and the mixture becomes dry and hard. It will not be softened by subsequent immersion in water. The temperature of the oven should not be raised to above about 250° Fahrenheit, so as not to produce chemical changes in the mixture, but only to dry and harden it. The salt is retained in the carbonate in a crystallized form. After the mixture has become thoroughly dried and hardened, it is taken from the oven and lifted from the mold by means of the cloth or paper lining. These plates may be formed or rendered electrically active in various ways. I prefer the following method: Two of the plates immersed in an electrolyte of salt-water acidulated, preferably with hydrochloric acid, are attached to the terminals of a battery. On passing a current of electricity through the plates, the plate attached to the positive pole absorbs oxygen, the carbonate becoming peroxide of lead, and the plate attached to the negative pole becomes hydrogenized metallic lead.

The peroxidation of the positive plate is accomplished as follows: The action of the current on the salt-water causes the formation of hyperchlorite of sodium. This is at once attacked by the acid in the electrolyte, causing chlorine gas to be set free, which, by reason of its great affinity for hydrogen, causes the oxygen of the water to be set free in a nascent state, which then unites with the positive plate, forming peroxide of lead. The salt in the plates is dissolved out by the electrolyte, leaving them porous or spongy throughout, thus presenting a very great surface to the action of the gases, and enabling the negative plate to readily absorb a large amount of hydrogen and the positive plate to become thoroughly peroxidized without any reversal of the current. After the forming process is completed, the plates are removed from the salt-water electrolyte, and an electrolyte of dilute sulphuric acid is used in the operation of the battery. Before using them in the battery, the plates should be washed in warm water to remove any chloride of lead that may have been formed during the charging process, and also to remove any salt that may remain undissolved in the plates.

A modification of the above-described process consists in immersing the plates of carbonate of lead mixed with salt (or with the salt omitted) in a solution of chloride of lime and allowing them to remain till converted into peroxide of lead. The peroxidation is effected in much the same way as in the process above described. The chlorine of the chloride, having a greater affinity for the hydrogen of the solution than for the lime, unites with the hydrogen, setting free the oxygen, which unites with the plate of lead carbonate, forming peroxide of lead. The salt in the plates of mixed salt and carbonate of lead is dissolved out, making them porous and more readily peroxidizable. In this way a large number of plates of peroxide of lead may be formed in a comparatively short time and at a small expense with a peroxide plate prepared in this way.

I prefer to use in the battery a hydrogen plate formed as follows: On a skeleton or core of lead a deposit of fine flaky lead is formed by the ordinary process of electrolysis. This is then placed between two plates of zinc, or a sheet of zinc is wrapped around it, and the whole immersed in sulphuric acid. The hydrogen of the sulphuric acid is set free in a nascent state, and is absorbed by the deposited lead, which is then ready for use as the negative plate of the battery; or two plates peroxidized in the manner above described may be associated in an electrolyte of dilute sulphuric acid, and then one of them reduced to hydrogenized metallic lead by means of a current of electricity to form the hydrogen element of the battery.

The plates of active material may be supported in the battery and separated from each other and form the bottom and sides of the cell by the devices shown in the drawings, in which A represents a partition of any suitable porous material, having on each side a recess, D, surrounded by a ledge, B. C is a plate of metallic lead, thickly perforated with holes to give free passage to the electrolyte, and having ears $a\ a$, to which the conducting-wires are attached. The active material is placed in the recess D, filling it to the level of the ledge B, and is held in place by the lead plate C, which is firmly cemented to the ledge B.

Figure 2:
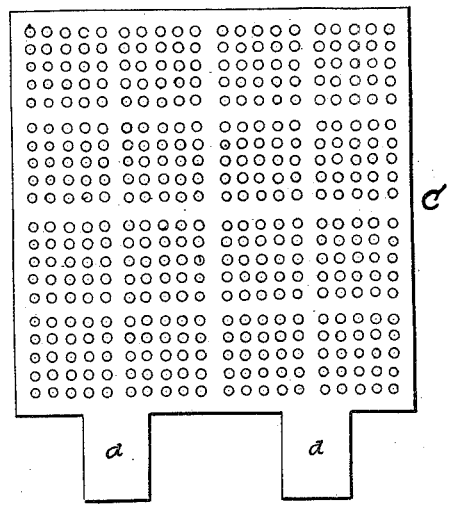
Figure 3:
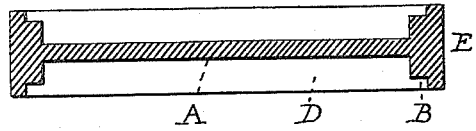
Figure 4:
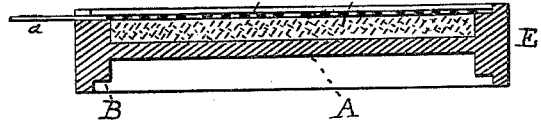
Figure 5:
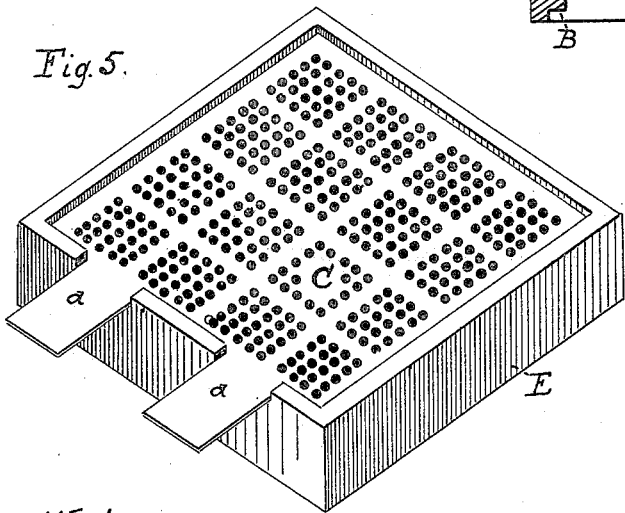

Figure 1 of the drawings shows a plan view, and Fig. 3 a sectional view, of the partition A. Fig. 2 shows a plan view of the lead plate C; Fig. 4, a sectional view, of the partition A, with the recess D on one side filled with active material, and the lead plate C attached; and Fig. 5 shows the perforated lead plate C, attached to one side of the partition A.

I am aware that carbonate of lead has been heretofore employed in constructing the plates of secondary batteries; and I do not broadly claim the use of it for that purpose.

What I do claim as new, and desire to secure by Letters Patent, is—

1. A plate or electrode for secondary batteries, consisting, primarily, of a mixture of carbonate of lead and chloride of sodium, hardened as described, and attached to a suitable frame or support, substantially as set forth.

2. In a secondary battery, the combination of plates or electrodes consisting, primarily, of carbonate of lead with an electrolyte of acidulated salt-water, substantially as and for the purposes set forth.

3. In a secondary battery, the combination of plates or electrodes consisting, primarily, of a mixture of carbonate of lead and chloride of sodium with an electrolyte of acidulated salt-water, substantially as and for the purposes set forth.

4. In the manufacture of secondary batteries, the hereinbefore-described process, consisting of, first, treating plates of carbonate of lead with a solution of chloride of lime to form the positive or peroxide plate of the battery, and, second, then combining such plates in an electrolyte with a suitable negative plate to complete the battery, substantially as set forth.

5. In the manufacture of secondary batteries, the hereinbefore-described process, consisting of, first, treating plates consisting of a mixture of carbonate of lead and chloride of sodium with a solution of chloride of lime to form the positive or peroxide plate of the battery, and, second, then combining such plate in an electrolyte with a suitable negative plate to complete the battery, substantially as set forth.

In witness whereof I have hereto set my hand in the presence of two witnesses.

WILLIAM STANLEY, JR.

Witnesses:
 CHAS. C. CLAGGETT,
 SANDS F. RANDALL.